Jan. 11, 1927. Re. 16,530

A. E. MOORES

GAS STOVE

Original Filed August 27, 1925

INVENTOR:
AEOLIAN E. MOORES.
BY Elliott Harrington
ATTORNEYS.

Reissued Jan. 11, 1927.

Re. 16,530

UNITED STATES PATENT OFFICE.

AEOLIAN E. MOORES, OF DALLAS, TEXAS.

GAS STOVE.

Original No. 1,577,651, dated March 23, 1926, Serial No. 52,787, filed August 27, 1925. Application for reissue filed June 21, 1926. Serial No. 117,576.

This invention relates, generally, to improvements in stoves, and, more specifically, to an improved heating stove in the use of which fluid fuel may be employed, the main object of the invention being to produce a stove of the class described which will be of simple construction and will function in an efficient manner.

Another object of the invention is to produce a stove of unique and novel form provided with means for reducing to a minimum the likelihood that the clothes of a person will be ignited by the flame within the stove.

Still another object of the invention is to produce a strong durable stove of neat appearance which may be manufactured at a relatively low cost, and which is provided with a pilot for igniting the fluid fuel, thus obviating the use of matches.

Figure 1:
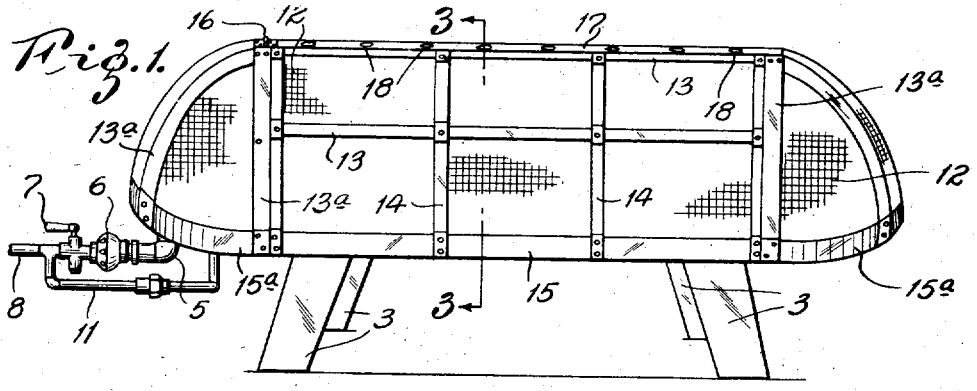
Figure 1 is a perspective view of a gas stove made in accordance with my invention.
Figure 2:
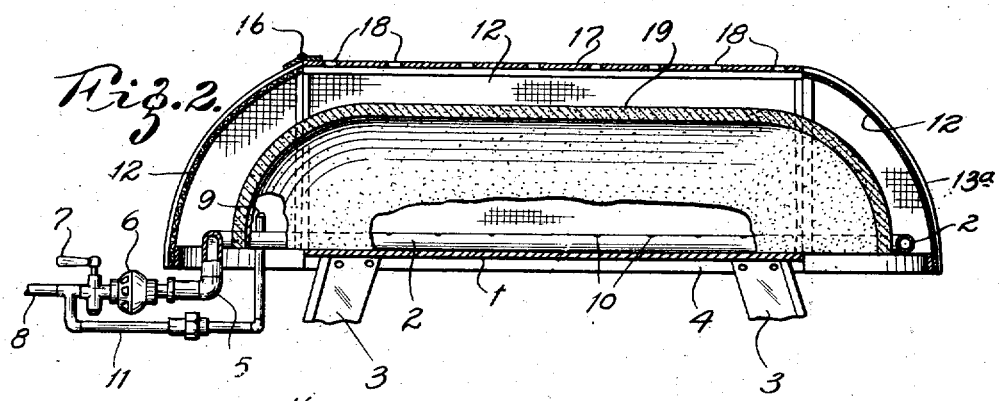
Figure 2 is a longitudinal section taken through the gas stove illustrated in Figure 1.

My improved stove comprises a bottom 1, upon which is supported a gas burner 2. The bottom 1 is provided with supporting legs 3 which are secured to the downwardly-turned flange 4 of said bottom, or said legs may be attached directly to the bottom in any suitable manner. The gas burner 2 is provided with a neck portion 5, an air-regulating device 6, and a gas cock 7, the last mentioned portions of the gas burner being connected to and in communication with the gas feed pipe 8. The burner 2 is preferably of one continuous piece and is supported on the outer margin of the bottom 1, the neck portion 5 extending below the bottom and being directed outwardly, as shown in Figures 1 and 2.

The pilot 9 is disposed just above the burner 2 in close proximity to the gas outlets or perforations 10 in said burner, and a pipe 11 connects the pilot to the feed pipe 8 beyond the gas cock 7. Because of this arrangement, gas will always flow through the pipe 11, regardless of the position of the gas cock 7. The pilot 9 is provided with an adjusting valve 9[a].

My improved stove is provided with a top or housing of fine gauze wire 12, which is secured to a frame composed of metallic strips 13, preferably of copper or brass of high polish, or any other suitable material. These strips 13 are fastened to each other in any suitable manner, as, for instance, by means of brads or rivets, and said strips are maintained in place by approximately vertical strips 14 which are attached thereto. The frame which supports the reticulated housing includes a bottom strip 15 which may be broader than the strips 13 and 14 to add rigidity and durability to said housing frame, and this bottom strip 15 is attached to the flange 4 of the bottom 1, as shown clearly in Figure 3, the wire cloth or gauze being interposed between the flange 4 and the strip 15 at both sides of the stove, as shown in the view just mentioned. The stove has an end covering forming a curved closure comprising strips 13[a] and 15[a], fastened together. A door adapted to close an opening through which access may be had to the interior of the stove housing is provided, said door having the same shape as the end closure and being hinged at 16 to a top center strip 17, extended longitudinally of the stove housing. The strip 17 is provided with spaced perforations 18 for gas fumes and heat outlet, said strip being of sufficient breadth to support vessels containing matter to be heated.

Seated upon the bottom 1 of the stove is a heat-deflecting element 19 in the form of clay, asbestos, or other suitable material. The heat-deflecting element is in more or less dome-shape, said heat-deflecting element being hollow, as shown clearly in Figure 3.

Figure 3:
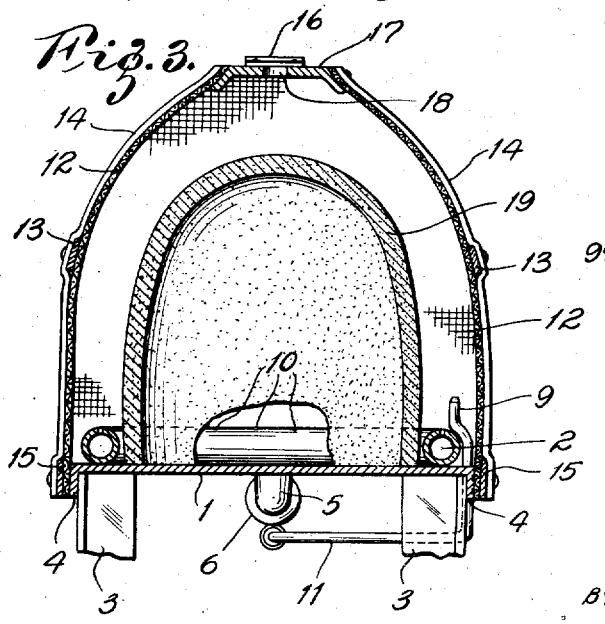
Figure 3 is a cross-sectional view taken on line 3—3 of Figure 1.
Figure 4:
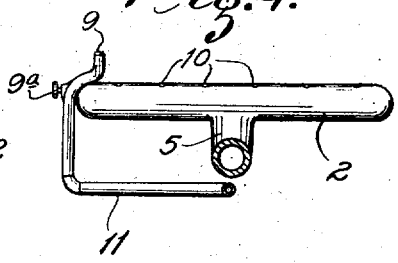
Figure 4 is a fragmentary detail view of the front end of the burner, and showing the position of the pilot.

It will be noted, by referring to Figures 2 and 3, that the gas burner 2 is so shaped that it surrounds the base portion of the heat-deflecting element 19, and it is also apparent that because of the arrangement of the perforations 10 in the gas burner, the heat of the flame arising from the gas burner will be directed against said heat-deflector.

From the foregoing, it will be apparent that when the pilot is burning, it will be necessary to merely open the gas cock 7 to provide instant heat, and because the pilot consumes very little gas, its constant operation will not materially increase the cost of operation of the stove. The flame issuing from the burner 2 is confined between the heat-deflecting element 19 and the wire gauze 12, and hence the likelihood that a person's clothing will come into contact with said flame is reduced to a minimum.

It is apparent that isinglass, or any other suitable material, may be substituted for the wire gauze, and it is to be understood, also, that other modifications may be made in the arrangement and construction of the stove in keeping with the following claims.

I claim:

1. A gas stove comprising a base, a gas burner supported by said base and having means for conducting gas thereto, an upstanding heat-deflecting element having inclined walls supported by said base, said gas burner extending along the outer sides of said walls at the bases thereof and arranged to direct flames upwardly along the outer sides of said inclined walls, and a reticulated housing surrounding said burner in spaced relation to the walls of the heat-deflecting element whereby, in operation, the flames and the heat-deflecting element are visible from without the gas stove.

2. A gas stove comprising a base, a gas burner supported by said base and having means for conducting gas thereto, an upstanding heat-deflecting element having inclined walls supported by said base, said gas burner extending along the outer sides of said walls at the bases thereof and arranged to direct flames upwardly along the outer sides of said inclined walls, and a reticulated housing surrounding said burner in spaced relation to the walls of the heat-deflecting element, said burner and said reticulated housing being so arranged with respect to each other that there is an unobstructed space between the burner and the reticulated housing whereby, in operation, the flames and the heat-deflecting element are visible from without the gas stove.

3. A gas stove comprising a base, a gas burner supported by said base and having means for conducting gas thereto, an upstanding heat-deflecting element having inclined walls supported by said base, said gas burner being so arranged that it surrounds the heat-deflecting element at the base thereof and being adapted to direct flames upwardly along the outer faces of the walls of said heat-deflecting element, and a reticulated housing surrounding said burner in substantial parallelism with relation to the walls of the heat-deflecting element whereby, in operation, the flames and the heat-deflecting element are visible from without the gas stove.

4. A gas heater stove comprising a base, legs attached thereto, a gas burner pipe supported upon the base and having means for connecting said burner to a gas feed pipe; a pilot with pipe connection to said feed pipe and providing a constant lighting means for said burner with means for adjusting the pilot; said pilot disposed adjacent a control valve; a heat deflecting dome of suitable material seated upon the base; a reticulated covering for the stove, a frame for the covering and a door in one end of the covering; the sides of said covering substantially following the line of an arch and connected at the top by a ridge or strip with spaced apertures; said door hinged to the covering, the door and opposite end of the stove having a rounded bottom and arched formation.

In testimony whereof, I have hereunto set my hand.

AEOLIAN E. MOORES.